E. W. DAVIES.
APPARATUS FOR MANIPULATING WORK PIECES IN ROLLING MILLS.
APPLICATION FILED DEC. 21, 1917.

1,325,080.

Patented Dec. 16, 1919.

Inventor
Evan W Davies
By Purcy H moore
atty

UNITED STATES PATENT OFFICE.

EVAN WALTER DAVIES, OF DOWLAIS, WALES.

APPARATUS FOR MANIPULATING WORK-PIECES IN ROLLING-MILLS.

1,325,080.      Specification of Letters Patent.      Patented Dec. 16, 1919.

Application filed December 21, 1917. Serial No. 208,207.

*To all whom it may concern:*

Be it known that I, EVAN WALTER DAVIES, a subject of the King of Great Britain and Ireland, residing at 31 Balaclava road, Dowlais, in the county of Glamorgan, Wales, have invented certain new and useful Improvements in Apparatus for Manipulating Work-Pieces in Rolling-Mills, of which the following is a specification.

This invention relates to appliances for the automatic manipulation of metal ingots and the like in rolling mills, and refers to improvements in or modifications of the invention for which I have made applications for patents in the United States of America, Serial No. 35668, filed 22nd June, 1915, and Serial No. 192156, filed on 19th September, 1917.

The object of my invention is to overcome a certain drawback as will hereinafter be apparent while it is characterized for simplicity of construction and adapted to provide for the turning of the work-piece, as in one of the forms of my invention above referred to, through angles up to as great as 180° automatically, in a single operation.

To effect this I so proportion the parts and so cut away or recess the walls or housing of the cross head carrying the turning clutch that the turn may be effected through the desired angle.

In order that my present invention may be fully understood I will describe the same with reference to the drawing accompanying this specification which shows the improved apparatus in three positions.

The same letters and numerals of reference are employed to denote the same parts in all the views, and also as far as practicable the symbols of reference are the same as those on the drawings accompanying my aforesaid prior specifications.

Figure 1:
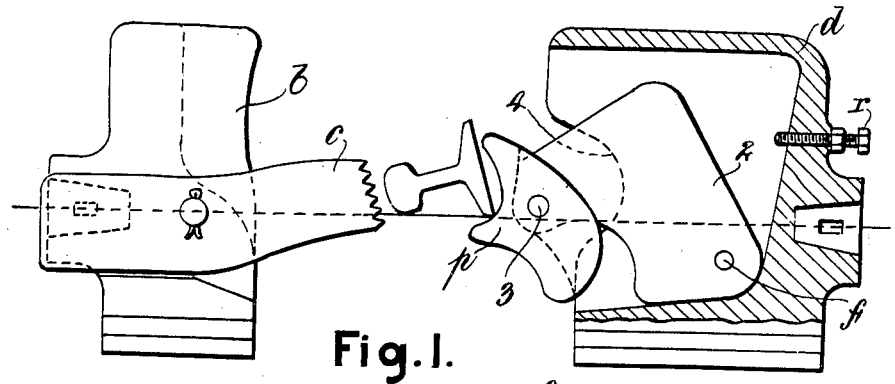
Figure 1 illustrates the positions of the parts when the ingot or work piece is about to be turned.
Figure 2:
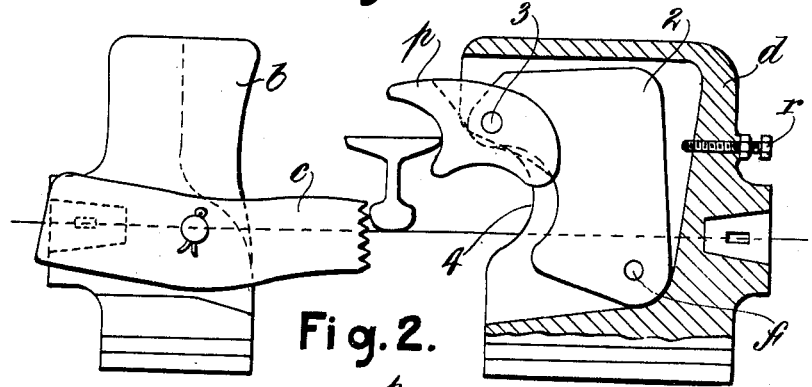
Fig. 2 shows the position of the parts when the ingot or work piece is partly turned and, Fig. 3 shows their position with the ingot or work piece fully turned.
Figure 3:
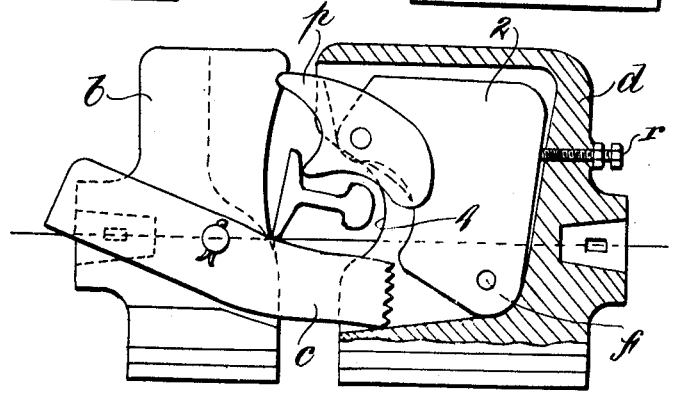

*d* is the recessed cross head, which has pivoted therein, at *f* a plate 3, the shape of which may be clearly seen from the drawing. Pivoted at 3 to this plate is the turning clutch *p*. The housing or walls of the recessed cross head *d* are cut away at 4, in order to enable the ingot to be turned without its coming into contact with the housing or walls. *r* is the adjusting screw for limiting the amount of tilt of the plate 2.

The turning clutch *p* and the plate 2 are so formed and the recesses so shaped that the tilting movement and the turning of the turning clutch *p* are so controlled that the latter is stopped in the required positions.

*b* is the other cross head carrying the counterbalanced member *c* which is preferably formed with a wide serrated portion as indicated.

The operation will be clearly understood from the drawings it being remembered that the devices are pushed toward one another by means of pistons, the rods of which operate the cross heads, as in the previous cases.

It will be understood that the precise details of construction may be varied within the scope of the appended claims without departing from the scope or spirit of the appended claims.

What I claim and desire to secure by Letters Patent of the United States of America is:—

1. An automatic apparatus for manipulating work-pieces in rolling mills, including a turning member comprising a chambered cross-head, a member pivoted within the chamber of said cross-head, said pivoted member carrying a turning clutch pivotally connected thereto, near its upper forward end, said cross-head and pivoted member being adapted to allow the turning-clutch, during the initial movement of said pivoted member to be carried downwardly and forwardly within said cross head in delivering the initial turning movement to the turning clutch, the chamber of said cross-head providing for the withdrawal thereinto of the clutch-carrying member, and means coöperating with the above referred to parts to aid in carrying out the aforesaid ends.

2. An automatic apparatus for manipulating work-pieces in rolling mills, including a turning member comprising a chambered cross-head, a member pivoted within the chamber of said cross-head, said pivoted member carrying a turning clutch pivotally connected thereto, near its upper forward end, said cross-head and pivoted clutch-carrying member being adapted to allow the turning clutch to be carried forwardly within said cross-head in delivering the turning movement to said clutch, said cross-head having the forward edges of its walls cut away to enable the work-piece to be turned without contact with said walls during said movement, and means coöperating with the above referred to parts to aid in carrying out the aforesaid ends.

3. Automatic apparatus for manipulating work-pieces in rolling mills, including a turning member comprising a chambered cross-head, a member pivoted within the chamber of said cross-head, said pivoted member carrying a turning clutch pivotally connected thereto near its upper forward end and said cross-head and pivoted clutch-carrying member being adapted to allow the turning-clutch, during the initial, intermediate and final turning movements of the turning-clutch, to be carried downwardly and forwardly within said cross-head, a counterbalanced contact member, a cross-head carrying the latter, the chamber of said crosshead providing for the withdrawal thereinto of the clutch-carrying member, and means for actuating said cross-heads.

In testimony whereof I affix my signature in presence of two witnesses.

EVAN WALTER DAVIES.

Witnesses:
WILLIAM J. PERKINS,
FLORENCE H. LITTLE.